United States Patent [19]

Gaskill

[11] Patent Number: 5,440,559
[45] Date of Patent: Aug. 8, 1995

[54] PORTABLE WIRELESS COMMUNICATION DEVICE

[75] Inventor: Garold B. Gaskill, Tualatin, Oreg.

[73] Assignee: Seiko Communications Holding N.V., Netherlands Antilles

[21] Appl. No.: 149,993

[22] Filed: Nov. 10, 1993

[51] Int. Cl.⁶ .................. H04B 10/22; H04J 3/00; H04Q 7/20

[52] U.S. Cl. .................. 370/95.1; 370/95.2; 340/825.34; 340/825.44; 455/38.3; 455/151.2; 455/231

[58] Field of Search .............. 370/94.1, 95.1, 95.2, 370/95.3; 340/825.34, 825.44; 455/33.4, 38.1, 38.2, 38.3, 54.1, 54.2, 56.1, 58.1, 151.2, 231, 343; 235/375, 377

[56] References Cited

U.S. PATENT DOCUMENTS

| | | | |
|---|---|---|---|
| 4,506,386 | 3/1985 | Ichikawa et al. | 455/38.3 X |
| 4,736,461 | 4/1988 | Kawasaki et al. | 455/38.3 X |
| 4,804,954 | 2/1989 | Macnak et al. | 340/825.44 |
| 4,897,835 | 1/1990 | Gaskill et al. | 370/94.1 |
| 5,054,051 | 10/1991 | Hoff | 379/56 |
| 5,150,954 | 9/1992 | Hoff | 340/825.44 |
| 5,155,479 | 10/1992 | Ragan | 340/825.44 |
| 5,166,932 | 11/1992 | Hoff et al. | 370/95.1 |
| 5,166,973 | 11/1992 | Hoff | 379/57 |
| 5,241,542 | 8/1993 | Natarajan et al. | 455/38.3 X |
| 5,266,942 | 11/1993 | Stoller | 340/825.34 |
| 5,276,680 | 1/1994 | Messenger | 455/38.3 X |
| 5,307,349 | 4/1994 | Shloss et al. | 370/95.2 X |

OTHER PUBLICATIONS

Jock Friedly, The Office of the 21st Century, Palo Alto Weekly, May 6, 1992, p. 20 et. seq.
"And Not a Personal Computer in Sight," *The New York Times* Oct. 6, 91, Section 3.
Xerox World, May 1990, pp. 1–16.
Mark Weiser, "The Computer for the 21st Century," *Scientific American,* Sep. 1991, pp. 94–104, vol. 265, No. 3.

Primary Examiner—Melvin Marcelo
Attorney, Agent, or Firm—Elmer Galbi

[57] ABSTRACT

A portable communication device which also has an infrared transceiver. A portable communication device can automatically establish infrared communication sessions with another portable communication device or desktop computer having an infrared transceiver. The portable communication device and the other device may exchange textual and graphical information, as well as the current time, and then reconcile the newly received information with that information in possession before the communication session began. Multiple portable communication devices and computers may communicate, while conserving battery power, using a time division multiplexing scheme where the infrared transceivers are active during a short, periodic time slots. Multiple communication session may overlap in time as long as they are not active during the same time slot.

4 Claims, 8 Drawing Sheets

PORTABLE WIRELESS COMMUNICATION DEVICE

FIELD OF THE INVENTION

The present invention relates to a portable wireless communication device capable of establishing an infrared communication link with another portable communication device, computer, or other electronic device.

RELEVANT ART

Many people use electronic devices to assist in keeping their information organized. One person may use a desktop personal computer at work and at home, a laptop or notebook computer on the road, a palmtop computer for those times when a notebook computer is too large, and a watch capable of holding scheduling information to ensure that information is always available.

Although these devices can communicate with each other, the process is not automatic and typically involves connecting cables. Infrared communication is possible, but because of its power consumption, must typically be disabled most of the time to conserve battery power.

What is needed is an automatic, wireless communication method and device that simplifies the transfer of information among electronic devices without requiring large amounts of battery power.

SUMMARY OF THE INVENTION

According to one aspect of the present invention, a personal communication device and a second device, both having respective infrared transceivers communicate using their infrared transceivers. To do so, the second device periodically transmits a hailing message using its infrared transceiver. The personal communication device periodically attempts to receive a hailing message using its infrared transceiver. When the personal communication device receives a hailing message, it transmits a response message.

As a feature, the personal communication device includes a security list of acceptable identification codes. The hailing message includes the an identification code uniquely identifying the second device. Upon receiving a hailing message, the personal communicating device compares the received identification code with the security list of acceptable identification codes. If there is a match the personal communication device transmits a response message.

As another feature, the second device includes a security list of acceptable codes. The personal communication device also transmits an identification code uniquely identifying it in its response message. When the second device receives the response message, it compares the received identification codes with its security list. Upon finding a match, the second device then sends any information intended to be sent to the personal communication device.

As another feature, when the personal communication device receives information from the second device, it sends any information intended to be sent to the second device.

Information exchanged between the personal communication device and the second device may include time of day information which has an associated code signifying the relative degree of accuracy of the information. This information can be used by the device receiving the information in resetting its internal time of day clock.

As another feature, the second device may continuously alternate between transmitting a hailing message and attempting to receive a response message, thereby increasing the probability of initiating a communication session with the personal communication device.

As another feature, for the synchronization of the transmit-receive process, the personal communication device may include a group list containing at least one group name. The personal communication device performs a hashing operation on a group name resulting in a time slot number of a time division multiplexing scheme. The personal communication device attempts to receive hailing messages within the time slot.

As another feature, the personal communication device transmits a hailing message during the time slot. Each time slot may have multiple start times; the personal communication device can be assigned a start time by assigning it a device number.

According to another aspect of the present invention, a computer having an infrared transceiver and a means of communicating with a broadcast facility for transmitting wireless communications may send a message to a personal communication device having an infrared transceiver and a wireless receiver according to the due date of the message. If the due date of the message is less than a predetermined period in the future from the current date, the computer communicates the message to the broadcast facility for transmission to the wireless radio-frequency receiver of the personal communication device. Otherwise, if the due date of the message is greater than a predetermined period in the future from the current date, the computer transmitting the message to the personal communication device via the infrared transceivers.

The foregoing and additional objects, features and advantages of the present invention will be more readily apparent from the following detailed description of preferred embodiments thereof which proceed with reference to the accompanying drawings.

DETAILED DESCRIPTION OF THE PREFERRED EMBODIMENT

Figure 1:
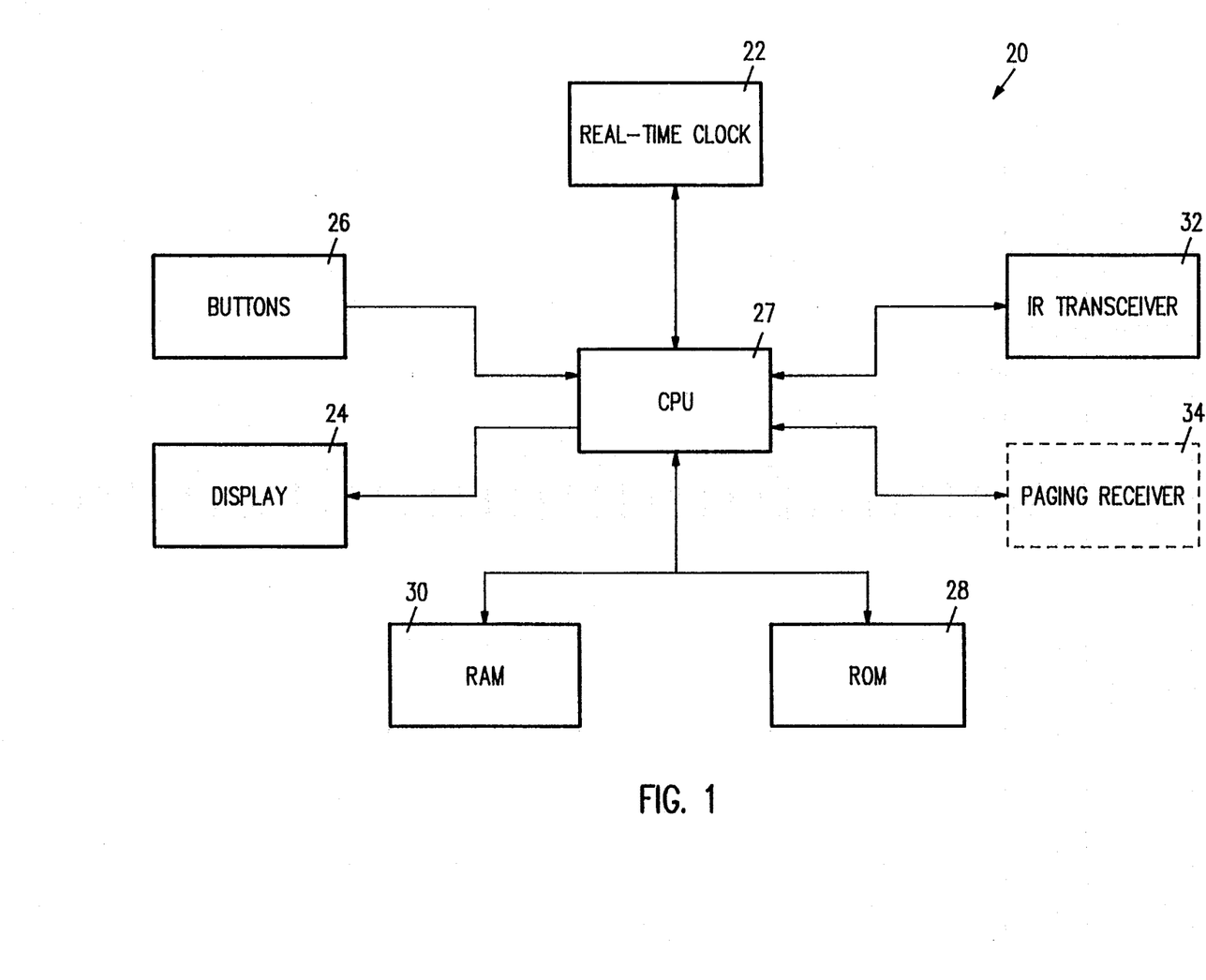
FIG. 1 is a block diagram of a personal communication device according to the present invention.

Referring now to the drawings, where like reference numbers refer to like elements, and particularly to FIG. 1, a personal communication device (PCD) 20 according to the present invention comprises the elements of a digital watch. Thus, the PCD includes a real-time clock 22 which can be set to the current time and which will keep accurate track of time from that point into the future. The PCD includes a display 24 on which the PCD can show the time, as well as other information, as is discussed below. Buttons 26 on the PCD allow the user to enter information into the PCD, such as the current time, appointment information, and alarms.

The real-time clock 22, and the display are controlled by a central processing unit (CPU) 27 which accepts the inputs from the buttons 26. The CPU executes programs stored in a Read-Only Memory (ROM) 28 and uses Random Access Memory (RAM) 30 for temporary storage of information input by the user, as well as information received from other sources.

An infrared (IR) transceiver 32 enables the PCD 20 to communicate with other electronic devices. The IR transceiver can communicate at 192,000 bits per seconds.

Optionally, the PCD 20 may also include a radio-frequency receiver, such as a paging receiver 34. The paging receiver enables the PCD to receive messages anywhere in a broad geographic area.

Figure 2:
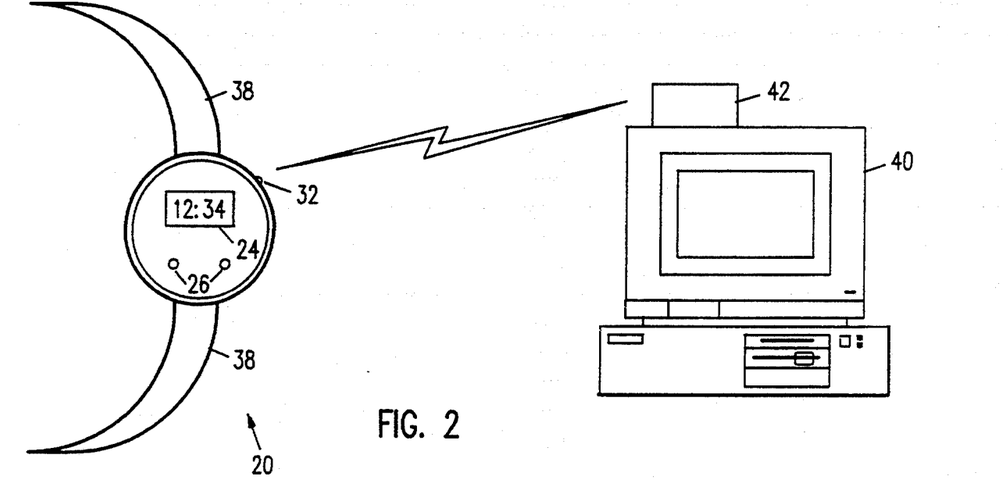
FIG. 2 is a schematic block diagram showing a personal communication device communicating with a personal computer.

Referring now to FIG. 2, the PCD 20 is preferably contained in a wristwatch form factor. Straps hold the PCD on the operator's wrist. The display 24 and buttons 26 are positioned as is conventional for digital watches. The infrared transceiver 32 is positioned so that its line of sight is likely to be unobstructed by the user's sleeves.

The PCD 20 need not be strapped on its user's wrist. However, the line of sight limitation of IR communication makes a wristwatch an ideal location for the PCD. When contained within a wristwatch, a PCD is likely to be always worn by its user, and accessible.

A first aspect of the present invention is for a PCD 20 and a computer 40 to automatically communicate and exchange information, as shown in FIG. 2. The personal computer may be the user's home computer or the computer assigned to the user at work.

A desktop personal computer 40 is unlikely to be battery powered and therefore is not extremely sensitive to power consumption. The personal computer 40 continuously attempts to establish a communication session with a PCD 20 by transmitting a "hailing" message using its IR transceiver 42.

Preferably, the IR transceiver 42 of the desktop personal computer 40 is located where it is in a direct line-of-sight with the PCD 20 when the user is typing. A location directly in front of the user's hands, such as on the keyboard or on the front of the display monitor, meets this requirement.

Figure 4:
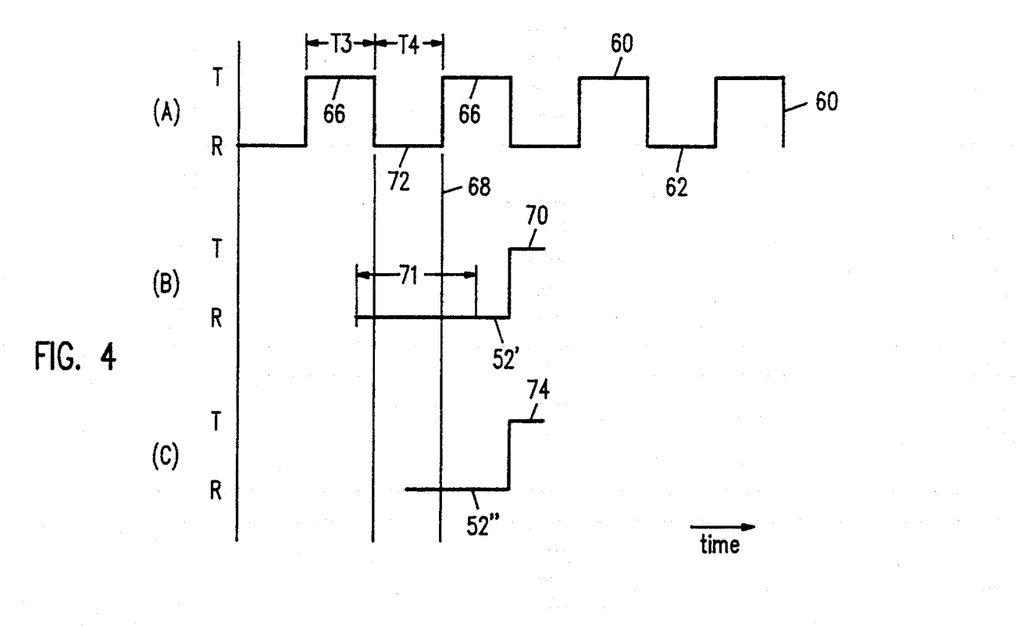
FIG. 4 is a chart showing the establishment of a communication session between a portable communication device and a personal computer.

Refer now to FIG. 4, in which the upper line 60 in row (A) represents the behavior of the personal computer 40 in attempting to establish an IR communication session with the PCD 20. The personal computer alternates between times 60 of duration T3 when it is transmitting a hailing message and times 62 of duration T4 when it is attempting to receive a response. As shown in FIG. 4, the time periods T3 and T4 are equal, and are one millisecond each. This need not be the case; the transmitting and receiving times need not be one millisecond and need not be equal.

A hailing message preferably is a relatively short sequence of information. For example, the hailing message of the personal computer 40 may consist of the current time and location, if known. In such a case, other IR receiving devices (not shown) within range of the computer could use the information contained in the hailing message to keep their internal real-time clocks synchronized with the computer's internal real-time clock.

Alternatively, or in addition to transmitting the current time, the hailing message may include an identification code (ID) which uniquely identifies the device transmitting the hailing message. This code may be used by receivers of the hailing message as an address to compare with an internal security list. If the ID is not in the security list, the receiver will not respond to the hailing message. A PCD 20 could be configured to communicate with a personal computer 40 by having its ID stored in its security list.

As will be appreciated, other information can be transmitted in a hailing message. However, to decrease the amount of time the portable communication device must activate its infrared transceiver to receive hailing messages, preferably, the length of the hailing message is limited.

In an exemplary version of the present invention, the hailing message is 192 bits, that is, 24 bytes, long. Since the IR transceivers 32, 42 communicate at 192,000 bits per second, the hailing message takes 1 millisecond to transmit.

The PCD 20, being the size of a wristwatch, is limited to using small-volume, and thus small energy capacity, batteries. As such, it is very sensitive to power expenditures. Its IR transceiver 32 uses a relatively significant amount of energy. For example, if the IR transceiver uses 10 mA, and if the PCD operates on a 100 milliamp-hour button battery, then the PCD could activate its IR transceiver for only ten hours before the battery would be expended. Therefore, continuous operation of the IR transceiver would result in unacceptably short battery life.

According to the present invention, a PCD 20 does not continuously attempt to establish a communication session. To conserve battery power, the PCD 20 operates its IR transceiver 32 intermittently, and then only long enough to ensure that it receives any transmission from the IR transceiver 42 of the personal computer 40.

Figure 3:
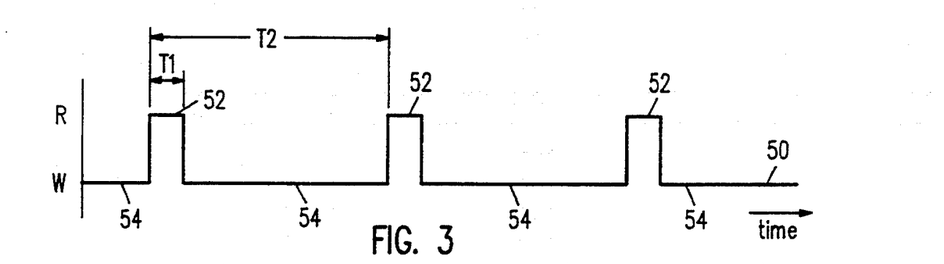
FIG. 3 is a chart showing the times during which a personal communication device attempts to receive hailing messages from other devices.

Referring now to FIG. 3, the line 50 represents when the PCD 20 is attempting to receive a hail. When the line is in the upper position, as shown by reference number 52, the PCD is attempting to receive a hail. In the lower position, as shown by reverence numbers 54, the PCD's IR transceiver 32 is depowered.

The time T2 between attempts to communicate is a balance between extending battery life and ensuring that a communication session occurs when the PCD 20 and the personal computer 40 are within range of each other. An exemplary time for T2 is 10 seconds.

The PCD 20 attempts to receive only long enough to ensure that it detects the beginning portion of a transmission from a personal computer 40. This minimum amount of time T1 is just longer than the time between consecutive beginnings of hailing messages from the personal computer 40. This is equal to T3 plus T4, and is two milliseconds in a preferred embodiment.

The PCD 20 thus powers its IR transceiver 32 for only 2 milliseconds every 10 seconds. Using the battery capacity and power consumption rates discussed above, this would result in a battery life of almost six years. Although other circuitry within the PCD will cause actual battery life to be less than six years, operation of the IR transceiver 32 according to the present invention results in a relatively small drain on the battery.

Referring again to FIG. 4, the lines in rows (B) and (C) represent the behavior of the PCD in attempting to establish a communication session with a personal computer 40.

As shown in row (B) of FIG. 4, the PCD 20 may attempt to receive 52′ while the personal computer 40 is transmitting 64 a hailing message. Because its IR transceiver does not detect the beginning of the personal computer's hailing message, it must wait until the beginning of the next hailing message 66 which begins at the time represented by the vertical line 68. Since this occurs before time period T1 elapses, the PCD is able to detect the hailing message.

Once the PCD 20 detects the beginning of a hailing message, it continues to receive the hailing message even after T1 seconds elapses. If the hailing message is acceptable, as will be discussed below, the PCD transmits 70 a response, resulting in the initiation of a communication session.

As shown in row (C) of FIG. 4, the PCD 20 may attempt to receive 52″ while the personal computer 40 is attempting to receive 72 a response. When the next hailing message 66 begins at time 68, the PCD detects it. If the hailing message is acceptable, the PCD transmits 74 a response, resulting in the initiation of a communication session.

Figure 5:
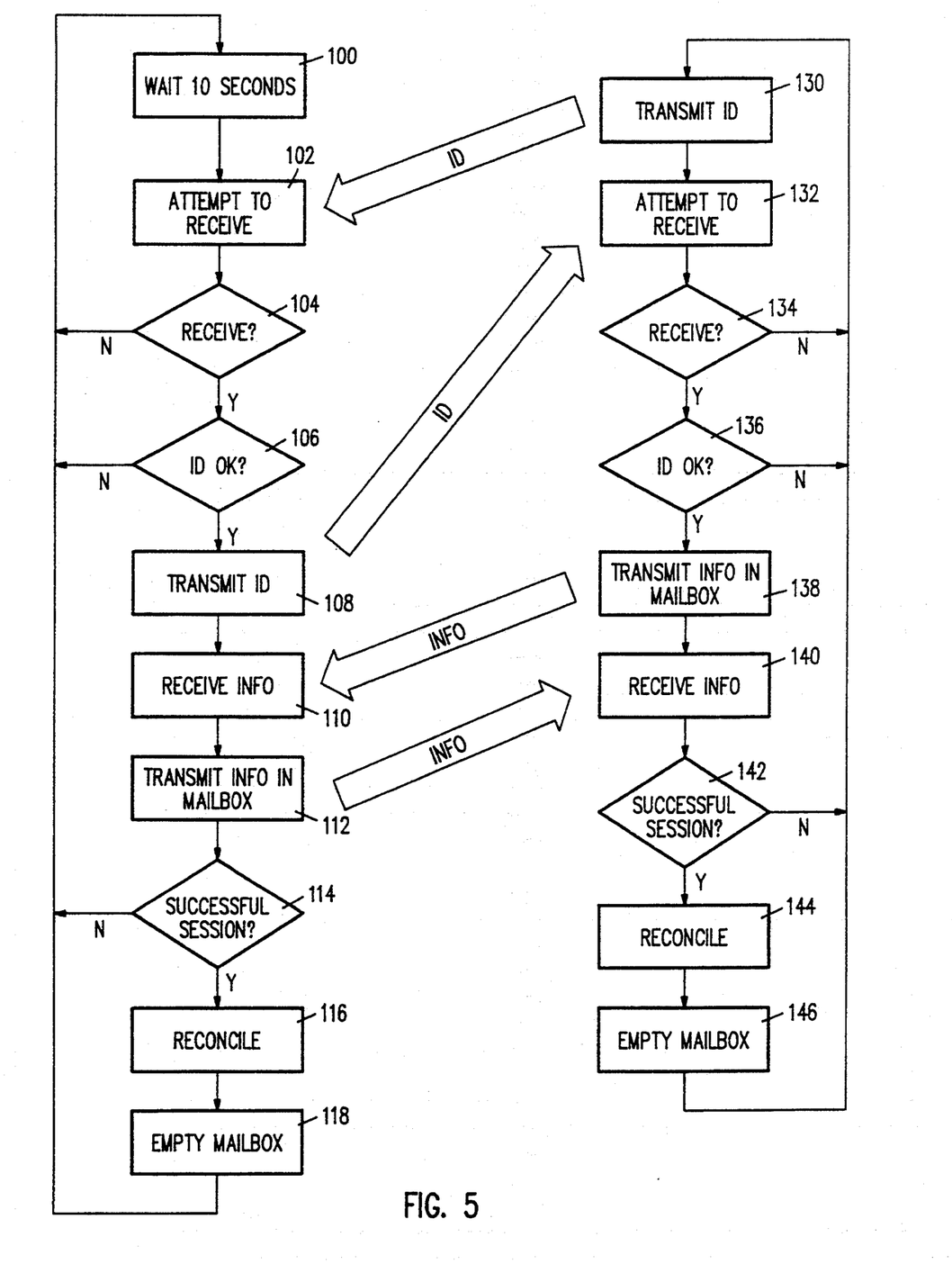
FIG. 5 is a flow chart showing the logic performed by a portable communication device and a personal computer in establishing a communication session.

The flowchart of FIG. 5 shows the logic performed by the PCD 20 and the personal computer 40 in establishing a communication session using their respective IR transceivers 32, 42.

As a first step 102, the PCD attempts to receive a hailing message. If the PCD 20 is not within range, or within line-of-sight, of the computer's IR transceiver 40, then the PCD would not receive a hailing message, and the second step 104 would result in a negative answer. The PCD would then wait for ten seconds, as shown by block 100 before again attempting to receive a hailing message.

After receiving a hailing message, the PCD 20 compares the received ID contained in the hailing message with its internal security list of acceptable IDs. If the ID is acceptable, as determined by step 106, the PCD transmits its ID in response, as step 108.

As next steps 110 and 112, the PCD 20 receives information from the personal computer 40 and transmits information to the personal computer. The information exchanged is discussed in more detail below.

The PCD 20 determines whether the communication session has been successful in step 114, and if not, waits ten seconds before attempting to receive another hailing message.

If the communication session is successful, the PCD 20 reconciles, as step 116, the newly received information with the information it had before the communication session. This reconciliation step is discussed in more detail below.

As a final step 118, the PCD 20 empties its "mailbox." The PCD keeps track of the information to be sent to the computer 40. These can be done by storing files to be sent in an "outbox" area of memory such as RAM 30, storing pointers to files to be sent, or simply attaching flags to files to be sent. Whatever method is used for determining which files need to be sent, this final step 118 marks the files as no longer needing to be sent.

The steps performed by the personal computer 40 in establishing an IR communication session are quite similar to those discussed above as being performed by the PCD 20. As a first step 130, the personal computer transmits a hailing message containing its ID.

The personal computer 40 then attempts to receive a response to its hailing message as step 132.

If a response is received, as determined in step 134, its ID is compared with the computer's internal security list as step 136. A negative response to either of steps 134 or 136 results in the personal computer 40 returning to the step 130 of transmitting its hailing message.

As next steps 138, 140, the personal computer 40 exchanges information with the PCD 20. The personal computer would transmit any information to the PCD that was in its mailbox to be sent.

The personal computer 40 determines whether the communication session has been successful in step 142, and if not, returns to the step 130 of transmitting its hailing message.

If the communication session is successful, the personal computer reconciles the information it received in the session with the information it had before the session began, as step 144.

As step 146, the personal computer 40 empties its mailbox. The computer need not use the same method of keeping track of which messages need to be transmitted. Regardless of what method the personal computer uses, in this step, it marks the transmitted information as no longer needing to be transmitted.

The PCD 20 and personal computer 40 can exchange a broad variety of information.

One type of information is scheduling information. The PCD 20 is an ideal device for storing a day's scheduling information since it likely to be worn while other electronic personal information managers, computers, or pager schedulers are left behind.

A user may enter scheduling information into the PCD using its buttons 26, changed the scheduling information, or received new scheduling information over its paging receiver 34. A scheduling and diary application on the personal computer 40 must be updated to remain accurate.

Similarly, the user may have entered new scheduling information on the scheduling application on the personal computer, changed scheduling information, or received new scheduling information from another source such as a network, modem, or wireless receiver. The scheduling information on the PCD 20 must be updated to ensure its user has the new or changed information.

The PCD 20 can also send to the personal computer 40 any information it receives by its paging receiver 34 from a paging network service. Weather forecasts, sports scores, winning lottery numbers, and stock information are all examples of information that can be received from a paging network service. A user may want these to be transmitted to the personal computer for storage or further analysis.

The personal computer 40 may receive information that the user may want transmitted to the PCD 20. The personal computer may receive information from a network, paging service, or other information source. This information could be of the same types as the PCD receives from a paging network service discussed above.

The personal computer 40 also may receive electronic mail that the user would like transmitted to the PCD 20 so that it may be viewed later.

Additionally, the PCD 20 and the personal computer 40 may exchange "time of day" information. The PCD and personal computer both include internal real-time clocks. For example, the time on the PCD could have been set manually by the user, or could be updated many times each day by a paging network service. Likewise, the computer's internal clock could have been manually set by the user, or may be automatically updated by a centralized program on a network.

Each of these sources of time has associated with it a different degree of accuracy. A manual setting of the time has a low degree of accuracy, probably not being more accurate than within a minute or two. In contrast, a paging network service could provide a highly accurate time, such as could be provided by basing it on a standards clock.

The internal clocks of the PCD 20 and personal computer 40 also have respective degrees of accuracy in maintaining time. Thus, the longer a clock has gone since being reset, the more effect its own lack of accuracy would degrade the accuracy of the time it maintains.

Preferably, the time of day information exchanged by the PCD 20 and the personal computer 40 would include the time and a number signifying its degree of accuracy. This number would account for the degrees of accuracy in the method of setting, the maintenance of time, and the amount of time that has passed since the clock was last set. The number may be expressed as a single byte, resulting in 256 potential degrees of accuracy.

In addition to the types of information discussed above, the PCD 20 and personal computer 40 may exchange other types of information. They may exchange text files containing memos, project information, and news, as well as graphics files containing information such as business charts and weather maps. The PCD 20 need not be able to display the information for the PCD and personal computer to be able to exchange it. As is discussed below, the PCD may serve as an intermediate storage device for transferring information between a user's work computer and home computer.

As part of the process of establishing and conducting a communication session, the PCD 20 and personal computer 40 reconcile the information they receive from the other with the information they already had before the communication session began. In reconciling the exchanged time of day information, the personal computer 40 and the PCD preferably use the degree of accuracy information to select whether to reset their internal clocks to match the time of day received from the other. If the time of day received in the communication session has a higher degree of accuracy than its internal real-time clock 22, then the PCD 20 would update its clock to match the received time.

Scheduling information received in a communication session also can be reconciled automatically; the most recently changed information has precedence over previously entered or changed information. Although less convenient for the user, manual reconciliation, where the PCD 20 and personal computer 40 prompt the user to verify any reconciliation decision, would ensure that the correct information remains.

The reconciliation of other types of information can be performed in the same ways as for scheduling information, both automatically or manually.

After establishing and completing a communication session, the PCD 20 and the personal computer 40 can handle subsequent communication sessions in various alternative manners.

The PCD 20 could continue to establish communication session every 10 seconds for as long as it is within range of the personal computer's IR transceiver 42. Since the subsequent communication sessions presumably would involve the transfer of less information, the subsequent communication sessions would be shorter and use less of the PCD's battery power. However, there is a baseline amount of power consumed per communication session since certain amounts of information, such as the ID and time of day information are transmitted by the PCD in each session.

Alternatively, the PCD 20 can ignore hailing messages that match ID of the personal computer 40 with which the PCD has recently had a communication session. This ignoring mode can continue for a preset time, such as ten minutes, after which the PCD would respond to any hailing message containing IDs in its internal security list. Ignoring hailing messages assumes that there is no new information of any import to exchange in the ignoring time period.

The PCD 20 can ignore hailing messages until an event occurs. One such event could be that the PCD fails to receive a hailing message from the personal computer 40 during one of the PCD's regular attempts to receive. This could indicate that the user had left his office and thus could have missed a message on his computer 40.

Also, the PCD 20 can ignore the personal computer's hailing message until a hailing message contains a code signifying that the personal computer 40 has new information to transmit. Depending on the desired size of the ID, the hailing message may have additional bits left to use as a "new information" flag for this purpose.

Communication between a PCD 20 and a personal computer 40 has been described primarily with reference to matching a single PCD 20 with a single computer 20. That is, a PCD would communication with only a single computer and a computer would communicate with only a single PCD.

This need not be the case. A PCD 20 could communicate with multiple computers 40. For example, a user may have a personal computer 40 at work and another personal computer at home, but desires the PCD to communicate with both. By programming the IDs of both personal computers into the security list of the PCD, the PCD can establish communication sessions with both computers.

Similarly, a family may own a single personal computer 40, but have more than one PCD 20. By programming the IDs of all the PCDs into the personal computer's internal security list, the computer can establish communication sessions with all of the PCDs.

Figure 6:
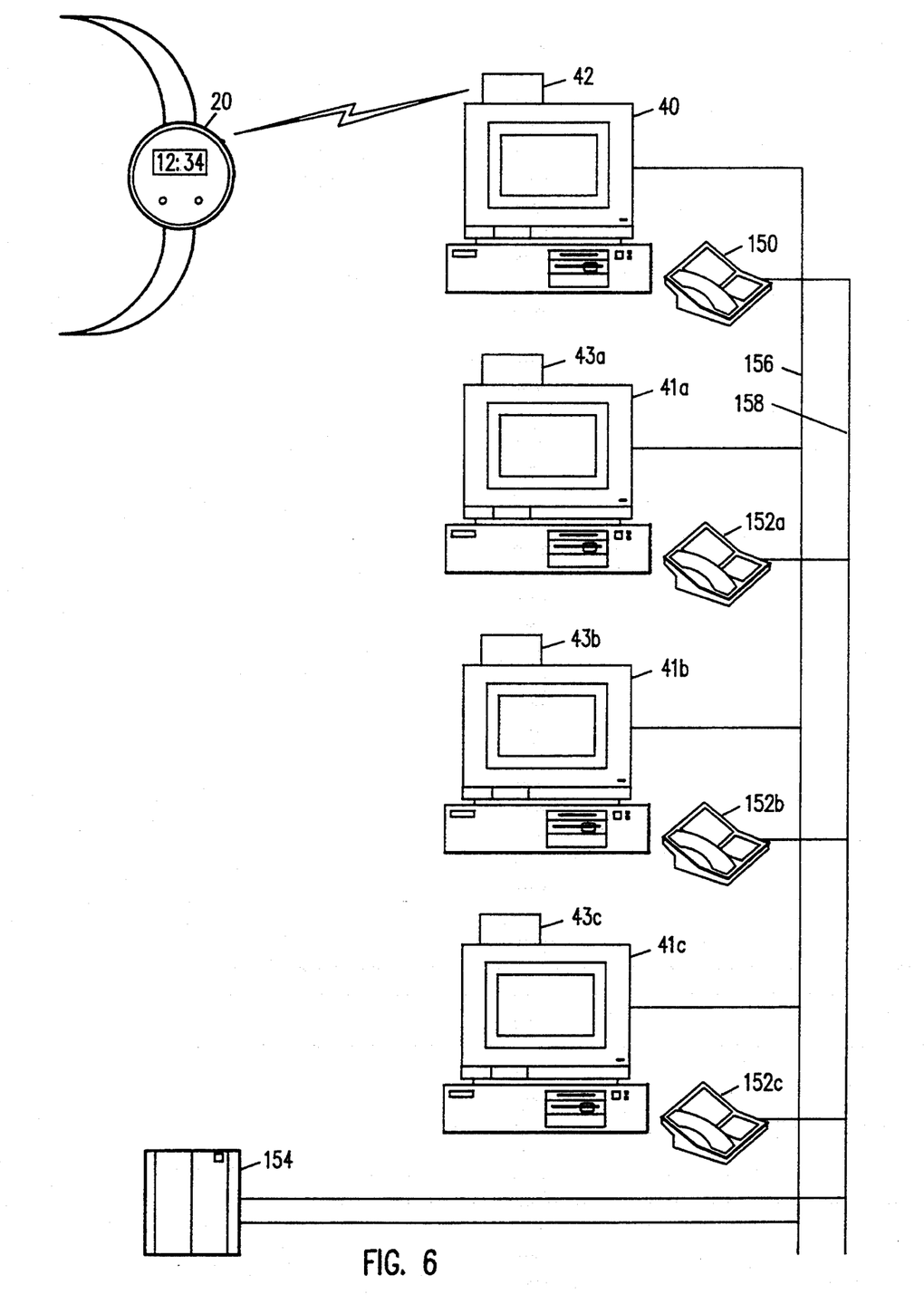
FIG. 6 is a schematic block diagram showing a personal communication device communicating with a personal computer on a network.

Additionally, as shown in FIG. 6, a corporation may have multiple computers 40, 41a–41c on a network 156 with multiple users. A user having a PCD 20 could establish a communication session with any computer having the PCD's ID in its security list. In this manner, information intended for a user is more likely to be received if any computer on the network can transfer it to his PCD than if the user can only receive the information from the personal computer 40 in his own office.

To increase the capacity of an internal security list, entries in the list may contain "wildcards." That is, a received ID need not have each of its digits match a respective digit in the security list. An exemplary format of a security IDs could define the first l digits as geographical identification, the next m digits as company identification, the next n digits as division identification, and the next 0 digits as personal identification. In such a case, a company may program the security lists on its computers to accept as valid IDs any ID that matches at least the company and division information, regardless of the information in the other digits.

Referring again to FIG. 6, a PCD 20 may communicate with multiple computers 40, 41a–41c connected to each other by a network 156. Each of the computers has a respective IR transceiver 42, 43a–43c and telephone 150, 152a–152c associated with it. The telephones are connected to each other and to a telephone switch 154 by a telephone network 158. The telephone switch is also connected to the computer network 156 for receiving commands therefrom.

The computers 40, 41a–41c preferably transfer electronic mail between themselves and run a network-based scheduling application program.

According to another aspect of the present invention, at least one of the computers 40, 41a–41c monitors all attempted and established communication sessions between the computers and PCDs, only one of which is shown by reference number 20. When one of the computers establishes a communication session with a PCD, the user of that PCD is assumed to be near that computer. By sending a message to the telephone switch 154, the computers can command the switch to send all phone calls intended for the user's telephone to be rerouted to the computer that has most recently established a communication session with his PCD.

For example, suppose the user of PCD 20 enters the office containing computer 41b and telephone 152b. The user's office is the one that contains telephone 150. When the user's PCD 20 establishes a communication session with the IR transceiver 43b associated with the personal computer 41b, the personal computer sends a command to the telephone switch 154 to reroute all subsequent telephone calls intended for telephone 150 to telephone 152b.

It will be recognized that other systems could use information of the location of a wearer of a PCD 20. For example, the user could be given access to certain programs and data on the computer 20 to meet software licensing or data security requirements.

Figure 7:
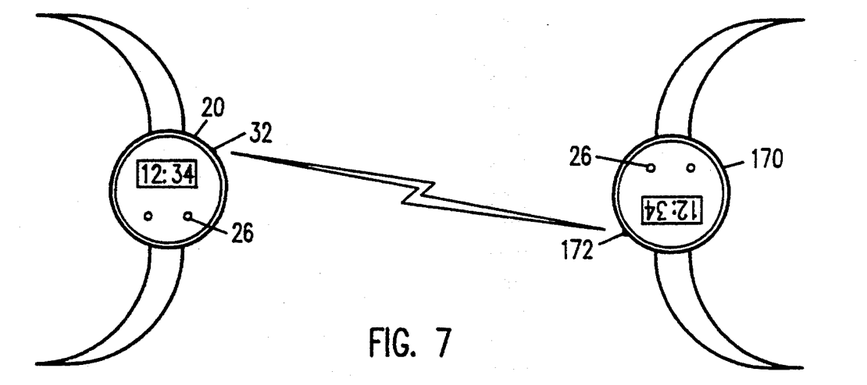
FIG. 7 is a schematic block diagram showing two personal communication devices communicating with each other.

Referring now to FIG. 7, according to another aspect of the present invention, a PCD 20 may establish communication sessions with another PCD 170. For example, a PCD 20 can be programmed to contain an "electronic business card." The electronic business card is a file that contains the user's name, company name, address, telephone number, facsimile number, electronic mail address, and other such information that would commonly be found on a standard paper business card. The electronic business card can also contain more detailed information such as past and current work projects.

To save battery life, a PCD 20 does not continuously attempting to establish a communication session with another PCD 170. Therefore, to manually exchange electronic business cards, two users of PCDs aim the respective IR transceivers 32, 172 of the two PCDs toward each other and press a button 26 on the PCDs. The users need not press the buttons simultaneously, and in fact cannot. However, this timing variance is used advantageously to establish a communication session.

Figure 8:
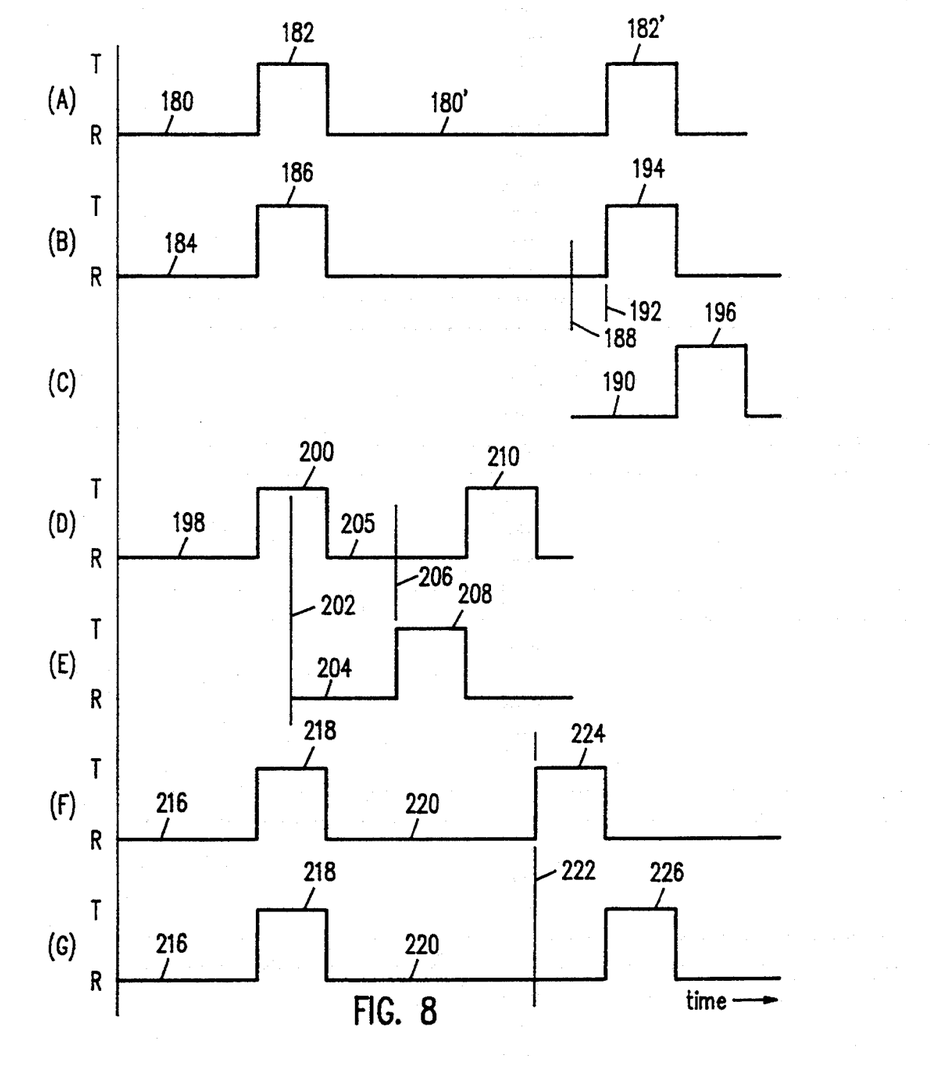
FIG. 8 is a signal chart showing various establishments of communication sessions between two personal communication devices.

Referring now to row (A) of FIG. 8, each PCD 20, 170, upon having the button 26 pressed goes initially into a receive mode 180, and then into transmit hailing message mode. If a communication session is not established during the first cycle, the PCD attempts to receive for a random period of time 180' and then transmits its hailing message again 182'.

Refer now to rows (B) and (C) of FIG. 8 which show the establishment of a communication session when both buttons are not pressed 26 at the same time. The button on the first PCD 26 is pressed first, causing it to go into receive mode 184 and then into transmit mode 186. At time 188, the button 26 on the second PCD 170 is pressed, causing it to into receive mode 190. At time 192, the second PCD 170 begins receiving the hailing message 194 from the first PCD 20. After receiving the hailing message, the second PCD transmits 196 its ID in response, thereby establishing a communication session between the two PCDs in which they exchange their electronic business card information.

Refer now to rows (D) and (E) of FIG. 8. As before, the button 26 on the first PCD 20 is pressed first, causing it to go into receive mode 198 and then into transmit mode 200. At time 202, the button 26 on the second PCD 170 is pressed, causing it to go into receive mode 204. The first PCD enters receive mode 205 before time 206, at which the second PCD begins transmitting its hailing message 208. In response to receiving the hailing message, the first PCD transmits its ID 210, thereby establishing a communication session. As above, the two PCDs exchange their electronic business card information.

Referring now to rows (F) and (G) of FIG. 8, if the two users press the buttons 26 on the first and second PCDs 20, 170 virtually simultaneously, then the PCDs simultaneously attempt to receive 216 and then attempt to transmit 218, preventing a communication session from being established. As discussed above, after attempting to receive and then transmitting without establishing a communication session, each PCD again attempts to receive 220 for a random amount of time, and then transmit again. In the example shown in the drawings, the first PCD 20 again begins transmitting 224 its hailing message at time 222. In response to receiving the hailing message, the second PCD 170 transmits 226 its ID, thereby establishing a communication session.

Optionally, the first attempt to receive 216 by the PCDs could be for a random time period.

It is possible that a PCD 20 does not establish a communication session with another PCD 170 because they are not within line of sight of each other, or the button 26 was inadvertently pressed. If no communication session is established within a certain time period, for example, 15 seconds, the PCD would inactivate its IR transceiver 32 and alerts the user to the failure.

Figure 9:
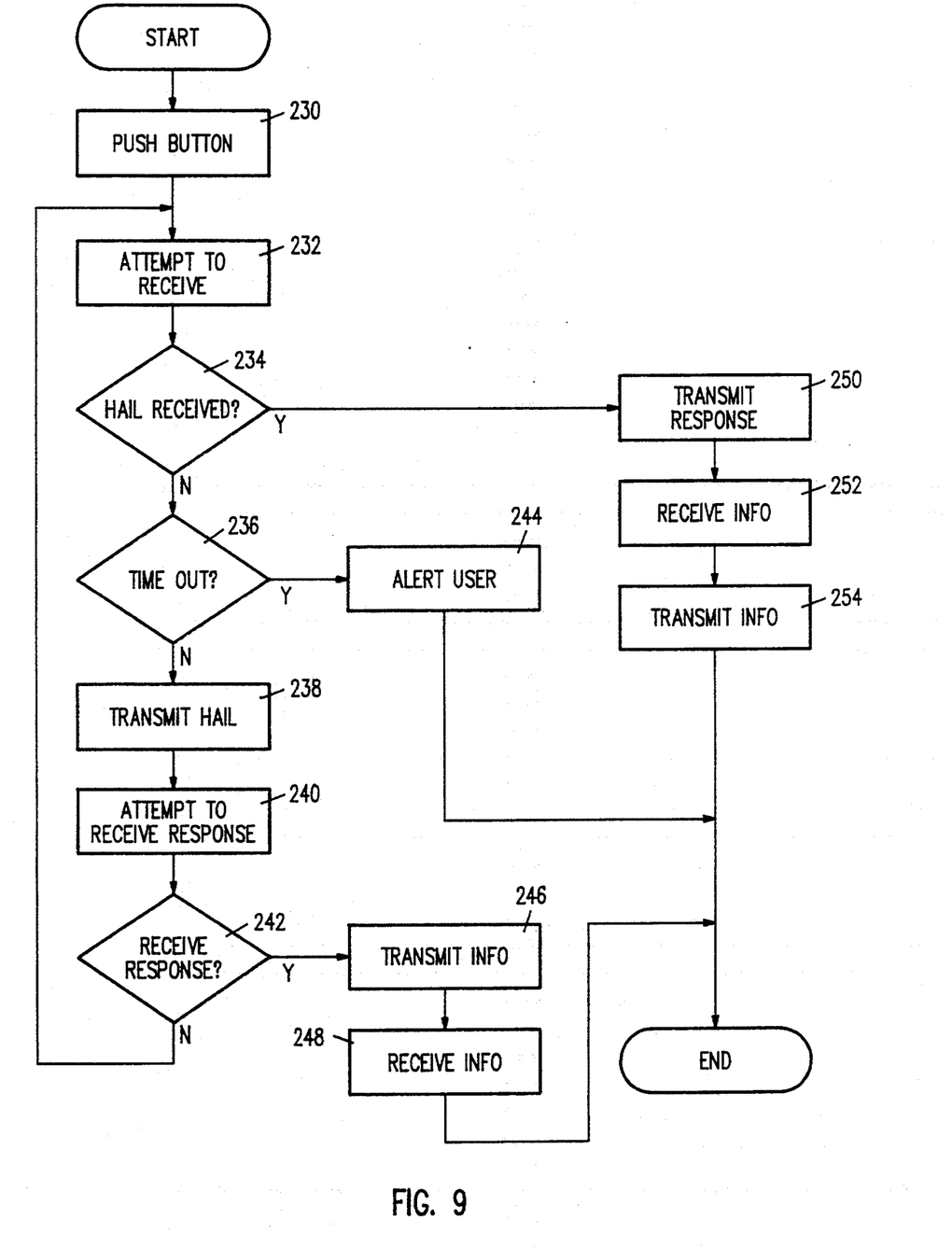
FIG. 9 is a flow chart showing the logic performed by a personal communication device in attempting to establish a communication session with another personal communication device.

Refer now to FIG. 9, which shows a flow chart of the manual electronic business card exchange process. When the button 26 is pressed 230, the PCD 20 attempts to receive the other PCD's hailing message, as shown by block 232. If the hailing message is received, as shown by block 234, then the PCD transmits 250 a response ID, receives 252 the electronic business card from the other PCD 170, and then transmits 254 its electronic business card.

Should the PCD 20 not detect a hailing message in its first attempt, it transmits 238 its own hailing message, and attempts to receive 240 a response. If a response is detected, as determined by block 242, then the PCD 20 transmits 246 its electronic business card and then receives 248 the electronic business card from the other PCD 170.

If a response to its hailing message is not detected, as determined in block 242, then the PCD 20 again attempts to receive the other PCD's hailing message at block 232. This time, however, the PCD attempts to receive the hailing message for a random amount of time.

Periodically, the PCD 20 determines how much time has elapsed in trying to establish a communication session, as shown by block 236. Should the elapsed time exceed a preset period, then the PCD 20 alerts the user to the failure, as shown by block 244, and quits trying.

The logic shown in FIG. 9 depicts the PCDs 20, 170 attempting to receive a hailing message 232 before transmitting their own respective hailing messages 238. Although this is preferred, it is possible to reverse the order and still establish a communication session. Likewise, either PCD could transmit its electronic business card information first, not necessarily in the order shown. Also, the check on elapsed time shown by block 236 could occur elsewhere in the procedure, as long as the check is regularly performed.

The PCDs 20, 170 can use the ID information contained in the received hailing message to determine what electronic business card information to send. For example, if the second PCD 170 has an ID that indicates its user works for the same company, the first PCD 20 could include company confidential information in the business card. As another example, if the other PCD has an ID that indicates it user lives in the same geographic area, the PCD could include a weather forecast received from a paging network service.

If there is no match in IDs, then only a minimal amount of information, such as is typically found on a paper business card, is sent.

There are circumstances where users of PCDs 20 may want to automatically establish communication sessions with personal computers 40, laptop computers, palmtop computers, or other PCDs. In this discussion, PCDs and the previously mentioned computers will be referred to as "devices."

Again, battery life considerations prevent PCDs 20 from continuously activating their infrared transceivers in an attempt to establish communication sessions. Additionally, if two devices were to continuously communicate, they would prevent other PCDs within range from being able to communicate.

Therefore, according to another aspect of the present invention, devices use time division multiplexing to divide the available time into multiple time slots. The period of a time slot is long enough to allow a reasonable amount of data to be transmitted within it. The number of time slots is limited so that the slots recur within a reasonable time, such as ten seconds.

Figure 10:
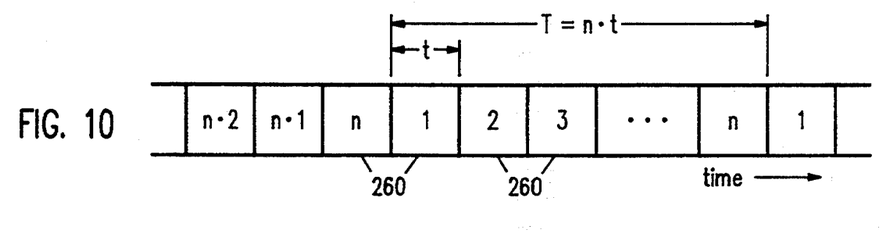
FIG. 10 is a chart showing multiple time slots in a time division multiplex scheme.

The chart of FIG. 10 shows a simple time division multiplex scheme having n slots 260, where each slot has a duration of t seconds. Each slot recurs in $T = n \cdot t$ seconds.

Figure 11:
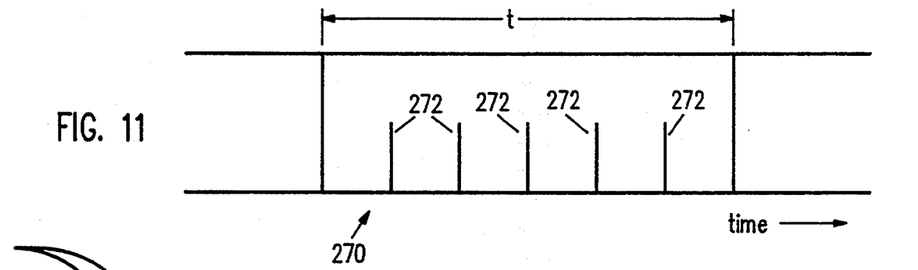
FIG. 11 is a chart showing multiple transmit start times within a single time slot.

Within each slot 270, as shown by FIG. 11, are multiple transmit start times 272, allowing for multiple devices to communicate within the same slot.

According to another aspect of the present invention, the time slot used by a person, family, or work group is determined by a hash operation on the name of the person, family, or workgroup desiring to communicate. This "group name" is programmed by the user into a "group list."

For example, a user may program the group name "Smith" into the group list of his PCD. The PCD performs a hash operation on "Smith" resulting in slot number to use for group communications. The same user can program the group name "Smith" into the group list of his other computers, and they all result in the same slot number for their group communications.

If a hash operation results in a slot already in use by another individual or group, a user can avoid the slot in use by changing the spelling of his selected group name, for example to "Smith1," or use another arbitrary designation for the slot.

The transmit start position 272 of each device within a group is preferably assigned according to a device number. Thus, if user Smith has a PCD 20, a palmtop computer, and a desktop computer 40 that he wishes to all communicate on the same slot, he may arbitrarily assign device numbers 1, 2, and 3, to the devices, respectively.

In operation, a device looks to its "group list" to determine which time slot to use. The device also looks to its device number to determine its transmit start time within the time slot.

During the time slot, the device attempts to receive from other devices within the same group. At its transmit start time within the time slot, the device attempts to start a communication session by transmitting its hailing message.

In a preferred embodiment, the hailing message would include the group name contained in the group list. It could also include the number of the time slot. The transmission of the slot number allows for error detection. Other, potentially unsynchronized devices may be within reception range. It they receive a hailing message, they can detect the unsynchronized situation by comparing the received slot number with the slot number the device thought it was receiving.

If a device detects a hailing message within its time period, it sends a response. The two devices then establish a communication session that occurs within the current and subsequent occurrences of the time slot.

For time division multiplexing to work, all participating devices must be synchronized. That is, all devices must have each slot start at the same time.

This can be accomplished by having each device know the exact absolute time. Then, according to a predetermined formula, each device can determine the starting time of each time slot.

For example, if time slots repeat every 30 seconds, a convenient formula would be to have time slot 1 start at each minute and at each half-minute. All other time slots could then be calculated by their respective numbers and the period of each slot.

Synchronization can also be accomplished by having each device know only the exact relative time. That is, a device need not know the time of day to know that slot 1 is starting. It need only be told when slot 1 starts once, and then can keep track of the current time slot from that time forward.

In other words, knowledge of the absolute time is not necessary, but knowledge of the absolute time modulo the repeat period T is.

According to another aspect of the present invention, a PCD 20 may be sued to send information between two computers. As discussed above, a user may have access to at least two computers, for example, having one computer at work and another at home. There are circumstances when such a user would like to be able to transfer information between the computers. This may be accomplished by having the first computer transmit the information to the PCD 20. Then, when the user is at the second computer, the PCD transmits the information to it.

Figure 12:
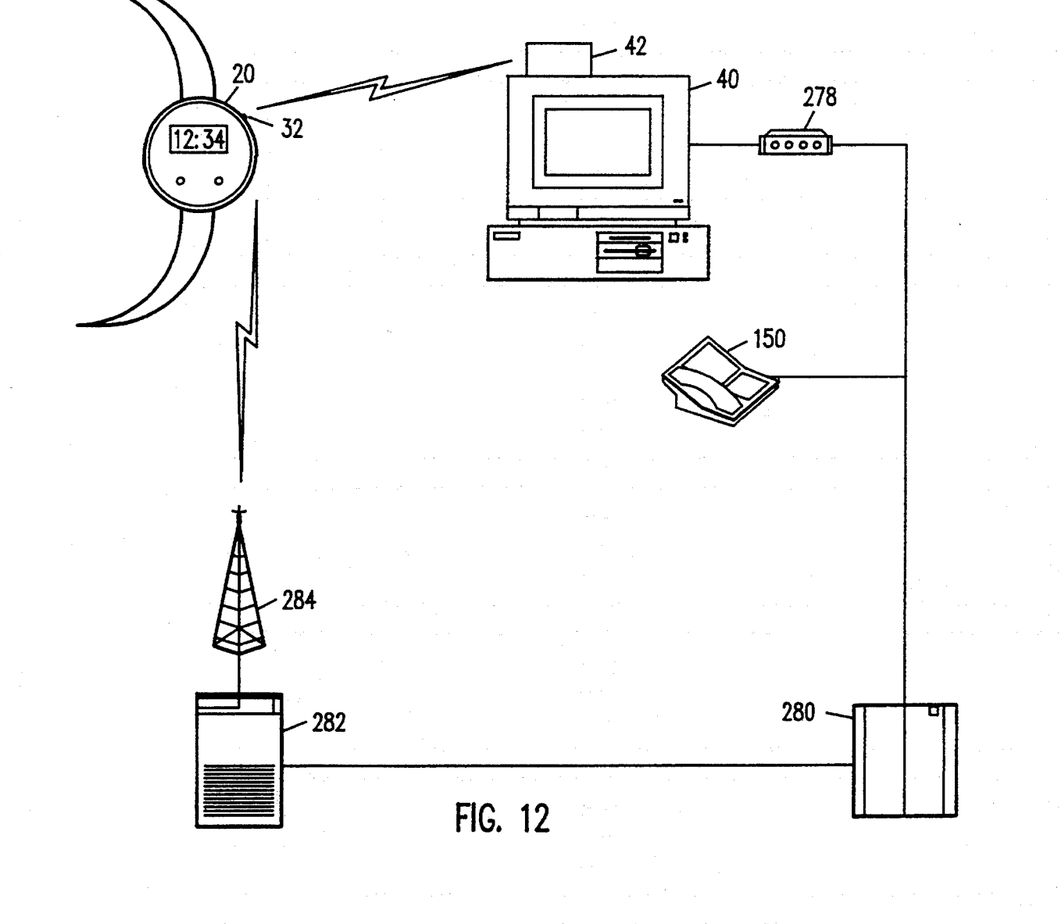
FIG. 12 is a schematic block diagram showing a personal communication device having two modes of communicating with a personal computer.

Referring now to FIG. 12, a personal computer 40 having an IR transceiver 42 can establish an IR communication session with a PCD 20 via its IR transceiver 32. If the PCD has a wireless radio-frequency receiver such as a paging receiver 34 (FIG. 1), the computer can also communicate with the PCD by calling the paging service's computers 282 using a modem 278 via the public telephone switch 280. The paging service's computer transmits the message to the PCD using it broadcast facilities 284.

According to another aspect of the present invention, a portable communication device 20 that has dual communication links allows a computer 40 that receives a message for the portable communication device's user to choose which communication link to use to send the message.

Figure 13:
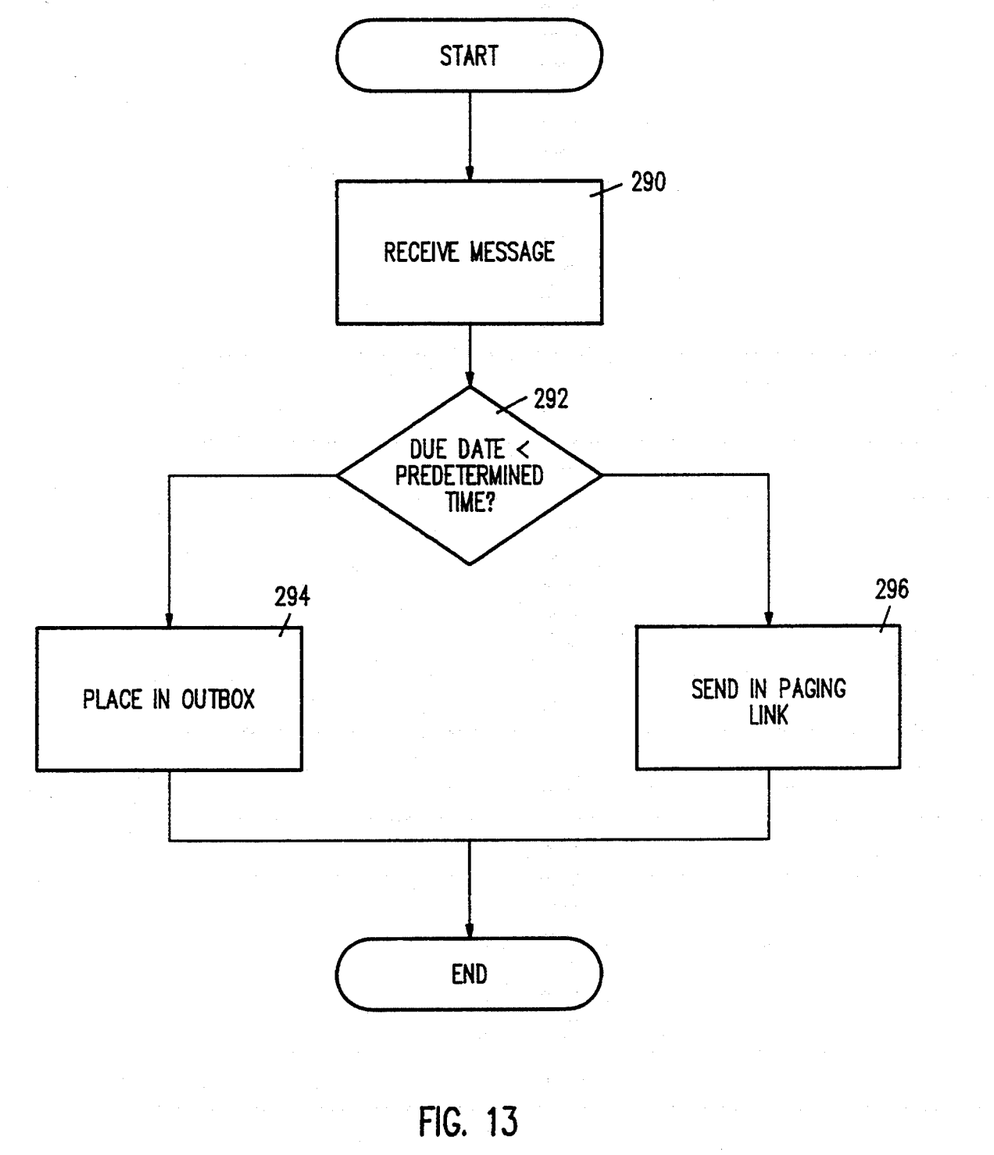
FIG. 13 is a flow chart showing the logic performed by the personal computer of FIG. 12 is deciding which mode of communication to use for communicating with the personal communication device of FIG. 12.

Referring now to FIG. 13, a personal computer 40 receives a message for the user of a portable communication device 20, as a first step 290. An exemplary message would be an electronic mail message indicating a scheduled meeting received from another computer by way of a network. As a second step 292, the personal computer 40 determines the due date of the message. If the due date is less than a predetermined time period away, then as a third step 296, the computer sends the message to the PCD by sending a message to the paging service's computers 282 which, in response, transmits the message to the PCD 20 via the broadcasting facilities 284. However, if the due date is greater than the predetermined time period away, then as an alternative third step 294, the personal computer 40 places the message in its outbox to be transmitted to the PCD 20 in the next infrared communication session. The predetermined time period could be set by the user to reflect how often the user was likely to be near his desktop computer 40.

It will be recognized that this need not be limited to infrared and radio-frequency transmissions. This method may be used advantageously with other pairs of communication channels.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

I claim:

1. A method for a personal communication device and a second device to communicate, where the personal communication device includes a receiver and the second device includes a short-range transmitter, the method comprising:

the second device transmitting a hailing message using the short-range transmitter of the second device; and the personal communication device periodically attempting to receive a hailing message using the receiver of the personal communication device wherein the personal communication device includes a group list containing a group name, further comprising the step of hashing the group name, resulting in a number representing a time slot, and wherein the step of periodically attempting to receive a hailing message is characterized by attempting to receive during the time slot.

2. The method of claim 1, wherein said personal communication device includes a transmitter and said method further comprises the step of the personal communication device transmitting a hailing message during the time slot.

3. The method of claim 2, wherein the personal communication device is assigned a device number, said method further comprising the step of calculating a transmit start time from the device number, and wherein the step of transmitting a hailing message during the time slot includes transmitting a hailing message at the start time within the time slot.

4. A method of communication between a computer and a personal communication device, where the personal communication device includes a first receiver and a second receiver, and where the computer includes a first means for communicating with the first receiver and a second means for communicating with the second receiver, the method comprising the steps of:

the computer receiving a message to be sent to the personal communication device, the message having a due date;

the computer comparing the due date of the message with a current date;

if the due date of the message is less than a predetermined period in the future from the current date, the computer using the second means for communicating with the second receiver to send the message to the personal communication device; and if the due date of the message is greater than a predetermined period in the future from the current date, the computer using the first means for communicating with the first receiver to send the message to the personal communication device.

* * * * *